(No Model.)
W. W. ROBINSON.
CHECK ROW ATTACHMENT FOR CORN PLANTERS.
No. 292,056. Patented Jan. 15, 1884.
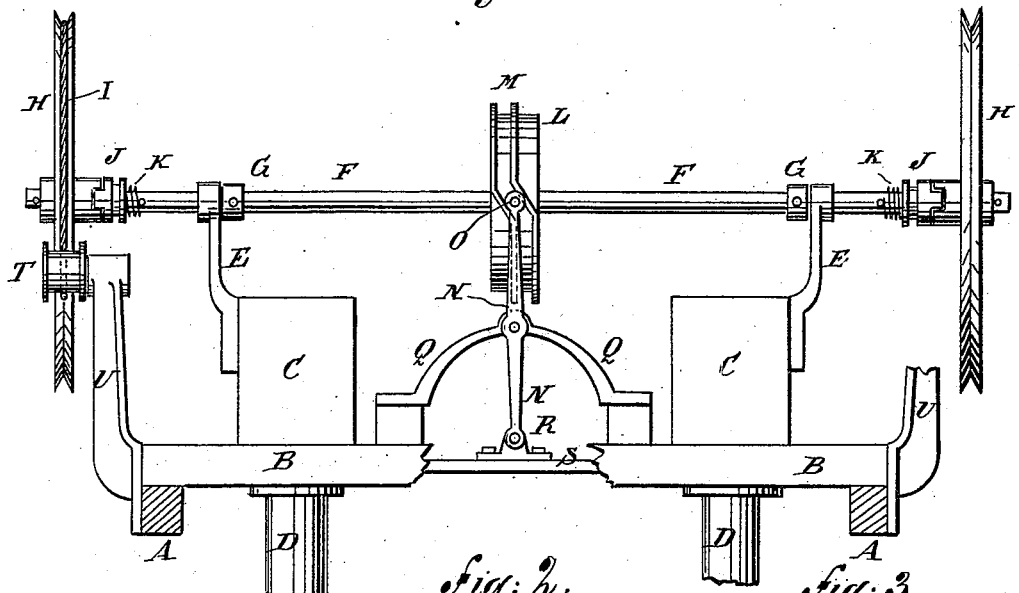
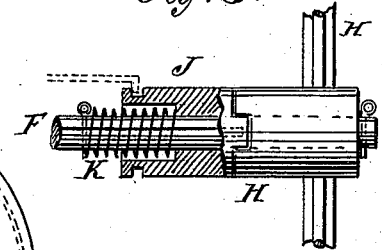
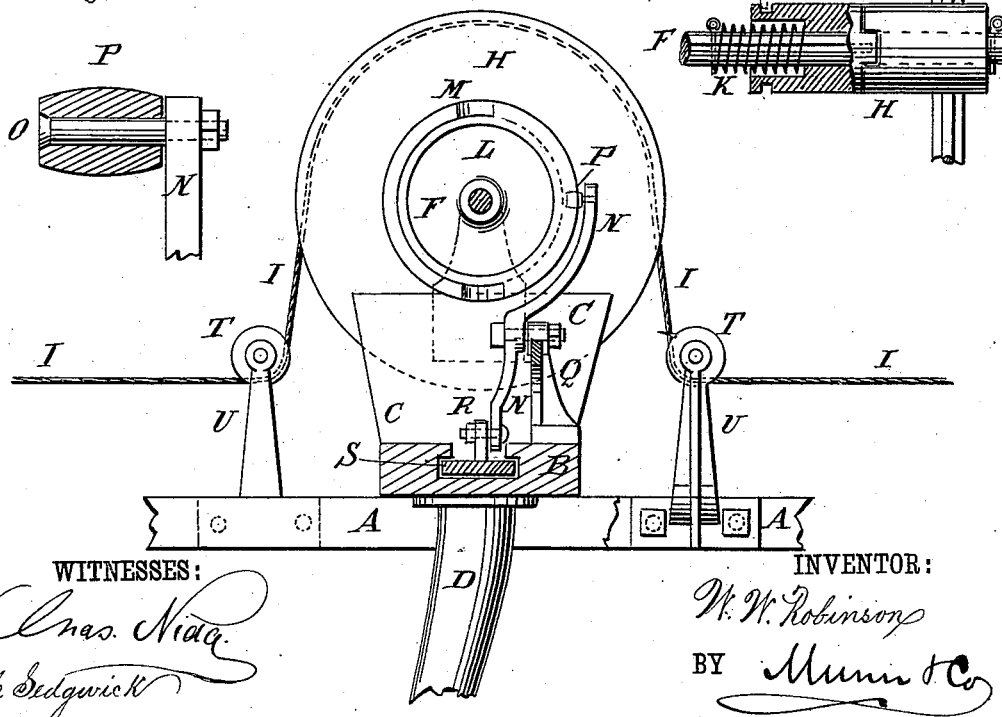
WITNESSES:
Chas. Nida.
C. Sedgwick
INVENTOR:
W. W. Robinson
BY Munn & Co.
ATTORNEYS.

UNITED STATES PATENT OFFICE.

WILLIAM W. ROBINSON, OF IDA GROVE, IOWA.

CHECK-ROW ATTACHMENT FOR CORN-PLANTERS.

SPECIFICATION forming part of Letters Patent No. 292,056, dated January 15, 1884.

Application filed August 14, 1883. (No model.)

*To all whom it may concern:*

Be it known that I, WILLIAM W. ROBINSON, of Ida Grove, in the county of Ida and State of Iowa, have invented certain new and useful Improvements in Check-Row Attachments for Corn-Planters, of which the following is a full, clear, and exact description.

Reference is to be had to the accompanying drawings, forming part of this specification, in which similar letters of reference indicate corresponding parts in all the figures.

Figure 1 is a rear elevation of my improvement, shown as applied to the frame of a planter. Fig. 2 is a sectional side elevation of the same. Fig. 3 represents a part of a drive-wheel and wheel-clutch, and shows the clutch-spring and a part of the drive-shaft. Fig. 4 represents the upper end of the cam-lever, the roller being shown in section.

The object of this invention is to facilitate the planting of corn in accurate check-rows.

The invention consists of the combination and disposition of parts, substantially as hereinafter fully set forth and claimed.

A represents the side bars of a planter-frame. B is the cross-bar, to which are attached the seed-boxes C and the spouts D, that conduct the seed to the ground.

To the seed-boxes C are attached brackets E, in bearings in the upper ends of which revolves a shaft, F. The shaft F is kept from longitudinal movement in its bearings by collars G, placed upon the said shaft, and secured in place by set-screws, so that the said collars can be adjusted to adapt the said shaft F to be applied to planters having their seed-boxes at different distances apart. If desired or more convenient, the brackets E can be attached to the planter-frame.

Upon the ends of the shaft F are placed grooved wheels H, to receive the check-line I, which may be a tarred rope, a wire, or a wire rope, as may be desired. The wheels H are made to carry the shaft F with them in their revolution by the clutches J, placed upon the said shaft F, and which are held forward to engage with the inner ends of the hubs of the said wheels H by spiral springs K, placed upon the said shaft F. The clutches J have annular grooves formed in them to receive the forked ends of levers for throwing the said clutches into and out of gear. The clutch-levers are not shown in the drawings, as there is nothing new in their construction.

To the center of the shaft F is attached a wheel, L, upon the rim of which is formed a groove, M, either by recessing the rim or by attaching flanges to or forming them upon the said rim. The latter construction is shown in the drawings. The groove M, at the opposite sides of the wheel L, passes in inclined directions from one edge of the rim to the other, as shown in Fig. 1, to adapt the said groove to serve as a cam for vibrating the lever N, which has a pin, O, attached to its upper end, to enter the said groove M. The friction between the pin O and the sides of the groove M is lessened by a roller, P, placed upon the said pin. The cam-lever N, at its middle part, is pivoted to a bracket, Q, attached to the cross-bar B, and the lower end of the said lever N is pivoted to a lug, R, attached to the slide S, that receives the seed from the seed-boxes C and drops it into the conducting-spouts D. The check-line I is kept in the groove of the wheel H by two pulleys, T, placed in the front and rear of the lower part of the said wheel H, so as to cause the said check-line to have a long bearing upon the wheel to prevent it from slipping upon the said wheel, and thus secure accuracy in the operation of the machine. The pulleys T are pivoted to brackets U, attached to the side bars, A, of the planter-frame. The ends of the check-line I are secured at the opposite sides of the field in the ordinary manner. With this construction, as the planter is drawn forward, the friction of the check-line I turns the wheels and shaft H L F and causes the lever N to move the seed-dropping slide S and drop the seed.

This improvement can be applied to any ordinary corn-planter.

I do not abandon or dedicate to the public any patentable feature set forth herein and not hereinafter claimed, but reserve the right to claim the same either in a reissue of any patent that may be granted upon this application or in other applications for Letters Patent that I may make.

Having thus described my invention, what I claim as new, and desire to secure by Letters Patent, is—

The combination, with the seed-boxes C and the seed-dropping slide S, of the brackets E, the shaft F, the wheels H, grooved to receive the check-line, the wheel L, having cam-groove M, the lever N, having roller P, and the bracket Q, substantially as herein shown and described, whereby the said seed-dropping slide will be operated by the advance of the machine, as set forth.

WM. W. ROBINSON.

Witnesses:
JOHN DICK,
F. W. SHEARER.